May 12, 1942.　　A. E. HERSHEY　　2,282,313
SIRUP INJECTOR FOR SEMI-SOLID FROZEN MASS
Filed May 14, 1941　　2 Sheets-Sheet 1
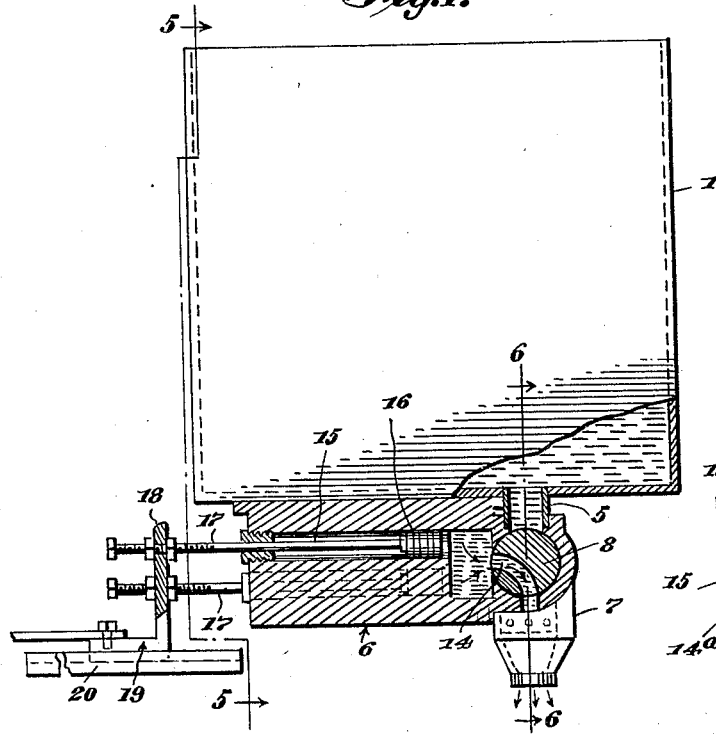
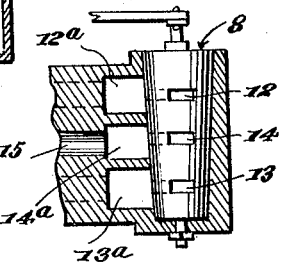
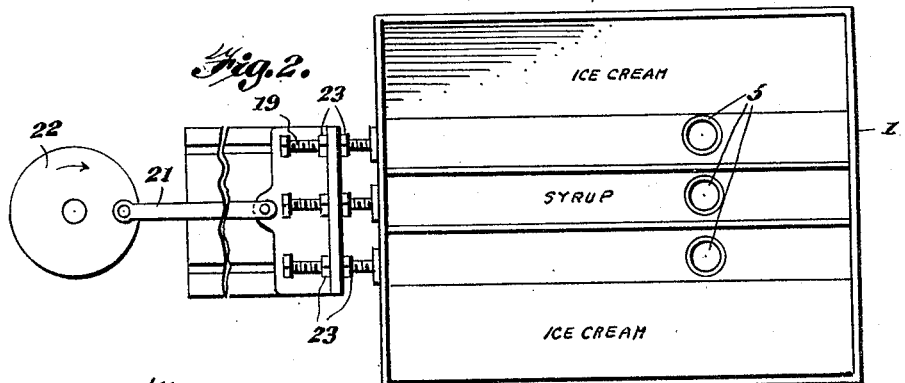
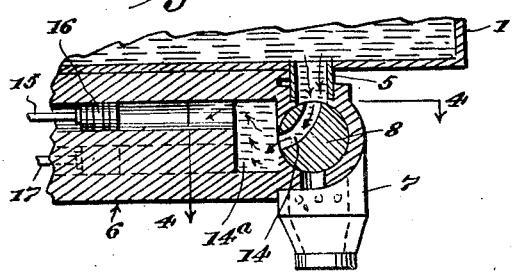
Inventor
ABRAM E. HERSHEY
By E. E. Vrooman & Co.,
Attorneys.

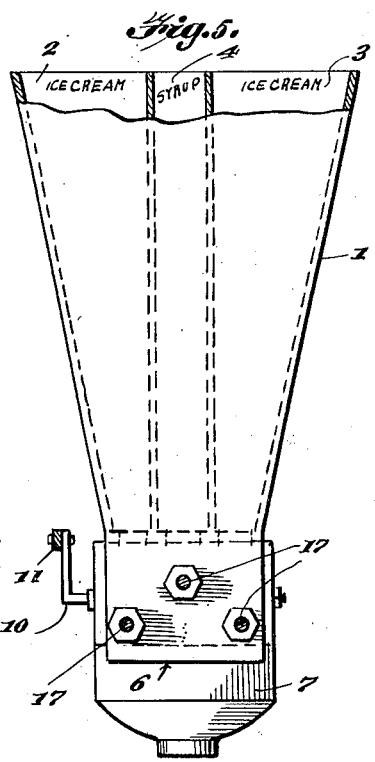
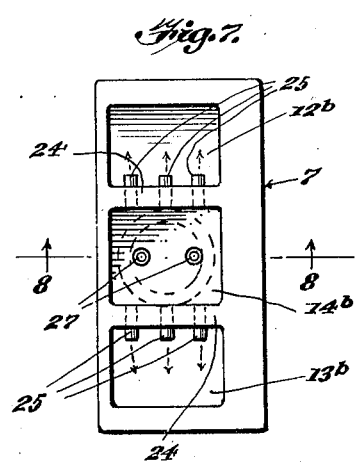
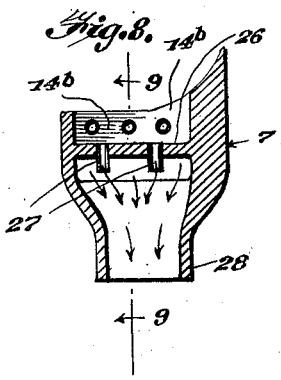
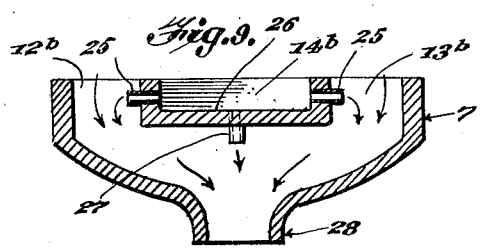
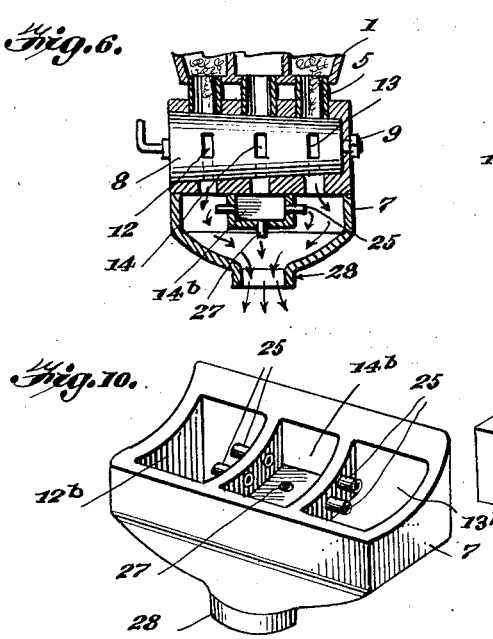
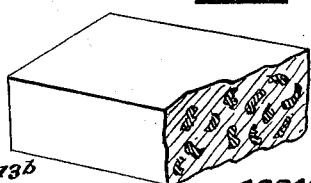

Patented May 12, 1942

2,282,313

UNITED STATES PATENT OFFICE 2,282,313

SIRUP INJECTOR FOR SEMISOLID FROZEN MASS

Abram E. Hershey, Harrisburg, Pa., assignor to Hershey Creamery Company, Harrisburg, Pa., a corporation of Delaware Application May 14, 1941, Serial No. 393,438

4 Claims. (Cl. 107—1)

This invention relates to a sirup injector for a semi-solid frozen mass.

An object of the invention is the provision of novel and efficient means for facilitating the placing of sirup, preferably in a mass of ice cream, whereby the finished product, or "brick" will show a plurality of distinct designs of coloring matter.

Another object of the invention is the construction of efficient means for depositing a liquid, such as chocolate sirup, in a body of ice cream that comprises portions of different flavors and then discharging the composition mass into a suitable container or package, whereupon the filled or loaded package is frozen, for handling or shipment, prior to consumption.

A still further object of the invention is the association with a divided hopper of a novel piston and valve casing, together with a sirup injector device, and such assembly producing excellent means for depositing ice cream in a container in such a combination or condition as will be highly pleasing to the public.

With the foregoing and other objects in view, the invention comprises certain novel constructions, combinations, and arrangements of parts as will be hereinafter fully described, illustrated in the accompanying drawings, and more particularly pointed out in the appended claims.

In the drawings:

Figure 1 is a view partly in side elevation and partly in vertical section of an apparatus constructed and partly in vertical section of an apparatus constructed in accordance with the present invention, while Figure 2 is a top plan view of the same.

Figure 3 is an enlarged fragmentary sectional view of the piston and valve casing and the injector casing.

Figure 4 is a sectional view taken on line 4—4, Figure 3, and looking in the direction of the arrows.

Figure 5 is a view taken on line 5—5, Figure 1, and looking in the direction of the arrows.

Figure 6 is a sectional view taken on line 6—6, Figure 1, and looking in the direction of the arrows.

Figure 7 is a top plan view of the injector casing.

Figure 8 is a sectional view taken on line 8—8, Figure 7, and looking in the direction of the arrows.

Figure 9 is a sectional view taken on line 9—9, Figure 8, and looking in the direction of the arrows.

Figure 10 is a perspective view of the injector casing.

Figure 11 is partly a perspective and partly a sectional view of the finished product, or ice cream "brick," showing the chocolate designs created in the product, in accordance with the process hereinafter specifically described.

Referring to the drawings, in which the preferred embodiment of this invention is illustrated, 1 designates a hopper that has two ice cream compartments, 2 and 3, with a central sirup compartment 4. At the bottom of each compartment is a tubular outlet 5.

A piston and valve casing 6 is placed against the bottom of hopper 1, and is secured thereto in any suitable manner, and against the inner end of casing 6 is secured the injector casing 7. A rotary valve 8 is placed in the inner end of the casing 6, this valve being held in position by the usual fastening means at 9, Fig. 6. A valve stem 10 (Fig. 5) projects from valve 8 and an operating rod 11 is connected to stem 10, for the purpose hereinafter specified. Rotary valve 8 is of a three-way structure; said valve has curved ports 12, 13 and 14. In the casing 6 is a sirup chamber 14a and ice cream chambers 12a and 13a. Each chamber 12a, 13a and 14a has a piston compartment 15 in communication therewith. In each compartment 15 is a piston 16. Piston 16 is connected to a piston rod 17. The piston rods 17 are threaded upon their outer ends and these threaded ends extend through the upright 18 of the angle slide 19. Slide 19 moves upon guide 20, Fig. 1. A link 21 is connected at its inner end to angle slide 19, and the outer end of link 21 is pivotally connected to the rotary unit 22. On each piston rod 19 are preferably two lock nuts 23. Upon loosening the lock nuts 23 on any given piston rod, the rod can be adjusted upon the upright 18, then upon tightening the nuts against the upright, the piston rod can be held in a fixed position on said upright. In this manner the stroke of the piston 16 can be controlled, whereby the quantity of ice cream or sirup drawn into and discharged from casing 6 can be controlled.

The elongated injector casing 7 has a dished upper face (Fig. 10) to fit snugly against the valve casing 6; said casing 7 includes ice cream passage 12b, shallow sirup compartment or container 14b and ice cream passage 13b. Extending through the walls 24 of the sirup compartment 14b are preferably a series of horizontal tubes 25; these short tubes 25 project into the passages 12b and 13b, whereby streams or ribbons of sirup, preferably chocolate sirup can be discharged into the body of the ice cream, passing through said passages. In the bottom 26 of sirup compartment 14b are preferably two vertical tubes 27 which are also provided for discharging streams or ribbons of sirup into the body of the ice cream as it passes towards the discharge spout 28. Discharge spout 28 is adapted to permit an ice cream mass to be emptied into a carton or package, whereupon the loaded package is frozen, prior to delivery or consumption.

In carrying out the process the ice cream, which in the present instance can be two flavors, is placed in the compartments 2 and 3 of hopper 1, and the sirup, preferably chocolate sirup is placed in compartment 4 of said hopper. Then as the apparatus is operating, the three-way rotary valve 8 is positioned so that its ports are in communication with the outlets 5 and the chambers 12a, 13a and 14a while at the same time 16 are moving outwardly on their stroke, thereby sucking the ice cream and sirup into the respective chambers, filling the same, whereupon the mechanism (not shown) will operate the rotary unit 22 and operating the rod 11 in timed relation, to move the valve 8 one-quarter of a turn, which places the ports in the position shown in Figure 1, whereupon the pistons 16, now travelling inward in their stroke, will force the ice cream and the sirup into the injector casing 7, the ice cream passing downwardly through passages 12b and 13b, whereas the sirup in compartment 14b will be discharged through the small tubes 25 and 27 into the body of the passing ice cream. The mass of ice cream passing through the injector casing 7 is far greater than the amount of sirup passing into the body of ice cream. Therefore, to maintain continuous streaks or ribbon-designs in the finished product, the novel process involves forcing sirup under considerable pressure through said small tubes, thereby producing continuous or unbroken ribbons in the brick of ice cream. It is to be understood that when these permanent ribbons of colored sirup (such as chocolate) have been injected in this novel manner, the brick of semi-frozen ice cream is frozen solid, whereby the ribbons of liquid sirup are encased in a frozen mass, while the sirup maintains an unfrozen or liquefied state.

The cycle of movement hereinbefore specified, for the rotary valve 8 and pistons 16 is repeated continuously, during the operation of the apparatus, for filling the containers or packages placed under spout 28.

The finished product of this novel method or process of treating ice cream comprises a substantially frozen mass encased in which are separate designs of semi-frozen or liquefied colored sirup. The flavor of the individual units of ice cream commingled in the body of each brick is not affected by the injection under high pressure of the sirup, but the pleasure of the consumer is greatly increased by tasting the flavor of the chocolate ice cream in the mass.

While I have described the preferred embodiment of my invention and illustrated the same in the accompanying drawings, certain changes or alterations may appear to one skilled in the art to which this invention relates during the extensive manufacture of the same, and I, therefore, reserve the right to make such changes or alterations as shall fairly fall within the scope of the appended claims.

What I claim is:

1. In a sirup injector for semi-solid frozen mass, an injector casing having ice cream passages and a central sirup container, and said sirup container being provided with horizontal tubes extending from its sides and with vertical tubes extending from its bottom discharging into said ice cream passages.

2. In a sirup injector for semi-solid frozen mass, an injector casing having a plurality of ice cream passages terminating in a common discharge passage, said casing being provided with a central sirup container, and said sirup container having a plurality of angularly-positioned means for discharging sirup into said passages, some of said means being capable of injecting in the direction of ice cream flow and others of said injecting means being capable of injecting in a direction at right angles to the direction of flow.

3. In a sirup injector for semi-solid frozen mass, an injector casing, a sirup container entirely within the upper part of said injector casing, said injector casing being provided with ice cream passages extending from the top of said sirup container and around and under said sirup container, and said sirup container being provided with means for discharging sirup in several directions with respect to the direction of flow of ice cream in said ice cream passages.

4. In a sirup injector for semi-solid frozen mass, an elongated injector casing having a dished upper face to fit a valve casing, a shallow sirup container within the dished upper face of said injector casing, said elongated injector casing having ice cream passages at opposite sides of said shallow sirup container, said sirup container forming the inner walls of said ice cream passages, and said sirup container being provided with means for discharging sirup in several directions with respect to the direction of flow of ice cream in said ice cream passages.

ABRAM E. HERSHEY.